Jan. 6, 1925.
F. W. MERRILL
REGULATOR
Filed May 17, 1921
1,521,824
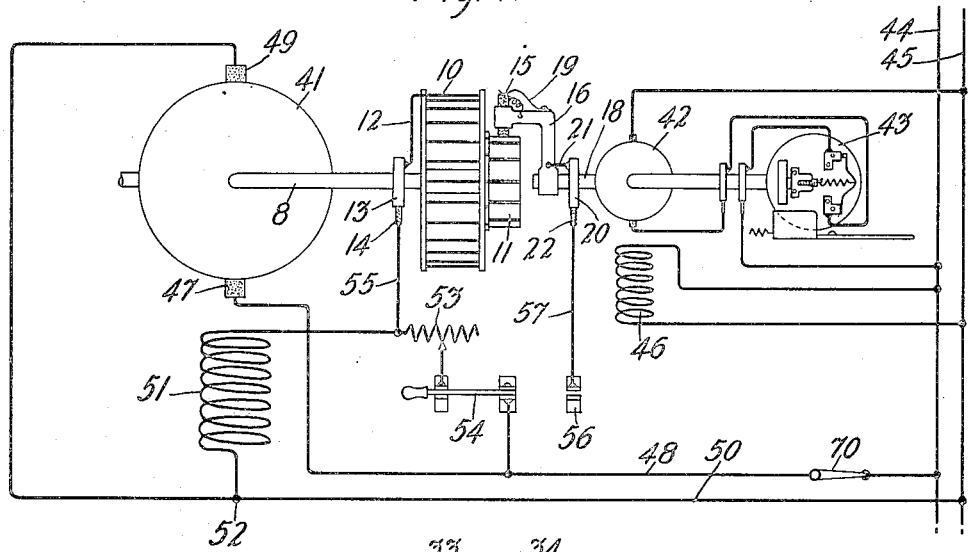
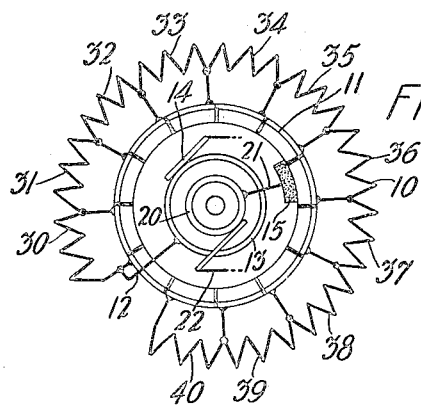
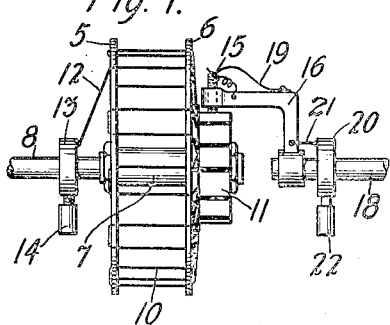
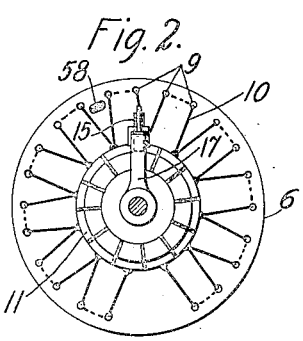
Inventor:
Frank W. Merrill.
by Hubert A. Pattison.
Att'y.

Patented Jan. 6, 1925.

1,521,824

UNITED STATES PATENT OFFICE.

FRANK W. MERRILL, OF EAST ORANGE, NEW JERSEY, ASSIGNOR TO WESTERN ELECTRIC COMPANY, INCORPORATED, OF NEW YORK, N. Y., A CORPORATION OF NEW YORK.

REGULATOR.

Application filed May 17, 1921. Serial No. 470,473.

*To all whom it may concern:*

Be it known that I, FRANK W. MERRILL, a citizen of the United States, residing at East Orange, in the county of Essex, State of New Jersey, have invented certain new and useful Improvements in Regulators, of which the following is a full, clear, concise, and exact description.

This invention relates to a regulator which is adapted to automatically vary the characteristics of an electrical circuit proportionate to the difference in speed of two rotating bodies.

More specifically, the invention comprises a rotatable impedance and a rotatable member cooperating therewith which varies the value of the impedance proportionately to the difference in their speed of rotation.

A regulator constructed in accordance with this invention may be used to advantage wherever it is desired to automatically regulate the impedance of a circuit proportionate to the difference in speed of two rotating mechanisms, systems employing the regulator for the purpose of maintaining the speed of dynamo electric machinery constant being disclosed and claimed in my copending application Serial No. 470,474 filed May 17, 1921. Distribution systems in which the regulator is employed to maintain voltage thereof constant are disclosed and claimed in my copending application Serial No. 470,472, filed May 17, 1921.

In the accompanying drawings illustrating one embodiment and use of the invention, Fig. 1 is a side elevation of a regulator constructed in accordance with the invention.

Fig. 2 is a front elevation of the construction shown in Fig. 1 as viewed from the right, the adjacent slip-ring being broken away to more clearly show the construction of the brush device.

Fig. 3 is a schematic illustration of the circuit connections of the regulator.

Fig. 4 is a schematic illustration of a system in which the regulator is used for maintaining the speed of a direct current motor constant.

Referring now to the drawings in detail in which like reference numerals designate similar parts throughout the several views, 5 and 6 represent parallel disposed circular plates constructed of insulating material spaced and carried by a hub 7 secured to a rotatable shaft 8. The plates 5 and 6 are provided with spaced and aligned openings 9 adjacent the peripheral edges thereof, through which a continuous, bare impedance 10, consisting of wire is wound back and forth, the said wire being doubled upon itself after passing through alternate openings in the plate 6 and connected to adjacent segments of a commutator 11 secured to the hub 7. The ends of the impedance wire 10 are connected to adjacent segments of the commutator 11, Fig. 3, and a conductor 12 connects one of said ends to a slip-ring 13 secured to but insulated from the shaft 8, a brush 14 bearing against the ring 13. Cooperating with the commutator 11 is a brush 15 reciprocately mounted within an opening formed in one leg of an L-shaped arm 16 the other leg of which is secured to but insulated from a rotatable shaft 18 mounted in direct alignment with the shaft 8. A spring 19 secured at one end to the leg 16 has its free end in engagement with the top of the brush 15 and serves to press it against the commutator 11. A slip-ring 20 is secured to but insulated from the shaft 18, the said ring being electrically connected with the arm 16 by a conductor 21. A brush 22 bears against the slip-ring 20.

The circuit of the regulator is clearly shown in Fig. 3 and may be traced from brush 14, slip-ring 13, conductor 12, sections 30 to 36 inclusive of impedance wire 10, brush 15, arm 16, conductor 21, slip-ring 20 to brush 22. If the brush 15 and commutator 11 are rotated at different speeds by the shafts 8 and 18, they will move relative to each other and introduce varying amounts of the impedance 10 between the brush 14 and brush 22, as is readily understood.

A regulator constructed as above described is shown in Fig. 4 as being employed in a system for maintaining the speed of a direct current motor constant. In this system, the motor 41, the speed of which is to be kept constant, is shown as directly connected to the shaft 8 so that the commutator 11 and the impedance element 10 will be rotated at the same speed as the armature thereof. The shaft 18, carrying the brush 15, is driven by a motor 42 or other suitable device, the speed of which may be set and kept constant. The motor 42 is shown as having interposed in its armature circuit an adjustable speed regulator 43 of the type disclosed in patent to B. F. Merritt, No. 1,306,072, dated June 10, 1919, the armature receiving current from a source of direct current connected to mains 44 and 45. The motor 42 is shown as of the shunt type, its field 46 being excited with energy derived from mains 44 and 45.

The commutator 11 and brush 15 are driven by the motors 41 and 42 respectively, in a clockwise direction as viewed in Fig. 3. One brush 47 of the motor 41 is connected to the main 44 by conductor 48, and switch 70, and its other brush 49 connected to the main 45 by conductor 50. The motor 41 is illustrated as being of the shunt type, its field winding 51 having one end connected to the conductor 50 at the point 52 and its other end connected to the conductor 48 through the medium of a variable impedance 53 and double-throw knife switch 54. The brush 14 of the regulator is connected to the field winding 51 by conductor 55, while the brush 22 thereof is connected to a contact 56 of the switch 54 by conductor 57.

In starting the system above described, the speed of the motor 42 is set and maintained at the desired point through the medium of the regulator 43. The switch 54 is then thrown to the position shown and the switch 70 closed setting the motor 41 in operation. The armature circuit for the motor may be traced from brush 47, conductor 48, switch 70, main 44, main 45, conductor 50, to brush 49; while its field circuit may be traced from main 45, conductor 50, field 51, resistance 53, switch 54, conductor 48 to main 44. By cutting more or less impedance 53 into the filed 51, the speed of the dynamo electric machine 41 may be regulated and brought in synchronism with the speed of the motor 42. A variety of different means may be employed for indicating when the motor 42 and dynamo electric machine 41 are operating in synchronism, the present invention incorporating means for giving this indication stroboscopically. The face of the plate 6, adjacent the brush 15, is provided with a spot 58 which serves as an image, Fig. 2. Since the plate 6 is driven at the same speed as the motor 41 and the brush 15 is driven at the same speed as the motor 42, if these machines are not in synchronism, the image 58 and the brush 15 will appear to move relative to each other. By varying the impedance 53, as previously explained, the speed of the motor 41 may be varied until the image 58 and brush 15 appear to be stationary relative to each other and to rotate together, indicating that the motors 41 and 42 are operating at the same speed. After the motors are in synchronism, the switch 54 may be thrown from the position illustrated to one in which it engages the contact 56. With the switch in this position, the impedance 53 will be cut out and the impedance 10 connected in series with the field 51 of the motor 41. The field circuit may now be traced from one side of the current source, main 45, conductor 50, field 51, conductor 55, brush 14, slip-ring 13, conductor 12, impedance 10, commutator 11, brush 15, arm 16, conductor 21, slip-ring 20, brush 22 conductor 57, contact 56, switch 54, conductor 48 to main 44. As long as the machines 41 and 42 rotate at the same speed there will be no relative movement between the brush 15 and the commutator 11 and the amount of impedance 10 cut into the field 51 will remain the same. If the motor 41 slows down, due to an increased load or other cause, the brush 15 will advance around the commutator 11 in a clockwise direction, cutting more impedance into the field 51, reducing the current flow therein and causing the armature of the dynamo electric machine 41 to speed up an amount sufficient to bring it back in synchronism with the motor 42. Should the speed of the dynamo electric machine 41 increase above the synchronous speed, the commutator 11 will advance clockwise relative to the brush 15. cutting out some of the impedance in the field circuit, permitting a larger flow of current therein, and causing a slowing down of the armature of the dynamo electric machine 41 an amount sufficient to bring it back into synchronism with the motor 42.

Although in the construction shown the impedance 10 is a continuous wire of one gauge, each of the sections 30 to 40 inclusive having the same value, it is to be understood that the size of the wire may be changed as often as desired throughout the progression of the winding to give the impedance any desired taper. Since the amount of impedance cut into the circuit in which the regulator is used is governed automatically by the regulator itself, the wire employed need not have a zero temperature coefficient, for in case the impedance in the circuit is increased due to the heating of the wire, a relative movement will take place between the commutator and brush, reducing the amount of the impedance in the circuit and automatically restoring equilibrium. In view of the fact that the wire employed is bare and exposed to the atmosphere, in rotating the heat generated therein will be rapidly dissipated.

What is claimed is:

1. A regulator comprising a rotatable hub, spaced and parallel plates carried thereby, said plates having a plurality of spaced openings, an impedance wire wound back and forth between said plates and passing through the openings therein, a commutator carried by said hub, the segments thereof being connected to said impedance wire at different points, and a rotatable brush engaging said commutator.

2. In combination with a dynamo electric machine, a regulator, a substantially constant speed motor for operating said regulator, a resistance in shunt of said regulator, and switching means for alternately placing said regulator and said resistance in circuit with said machine.

3. In combination with a dynamo electric machine, a motor, an automatically operating regulator for regulating said dynamo electric machine under the joint control of said machine and said motor, a manually operable regulator for initially regulating said dynamo electric machine and switching means for alternately rendering said regulators effective.

4. In combination with a dynamo electric machine, a motor, an automatically operating regulator for regulating said dynamo electric machine under the joint control of said machine and said motor, a stroboscope comprising elements of said automatically operating regulator for determining when said regulator is in condition for service, a manually operable regulator for initially regulating said dynamo electric machine, and switching means for alternately rendering said regulators effective.

5. Means for regulating the field current of a dynamo electric machine comprising a motor and a variable and automatically operating impedance element under the joint control of said motor and said dynamo electric machine, a manually operable impedance element for bringing said motor and said dynamo electric machine into synchronism and means for substituting said automatically operating impedance element when said motor and said dynamo electric machine have reached synchronism, either one or the other of said impedance elements being in the field circuit of said dynamo electric machine under control of said substituting means.

6. Means for regulating the field current of a dynamo electric machine comprising a motor and a variable and automatically operating impedance element under the joint control of said motor and said dynamo electric machine, a manually operable impedance element for bringing said motor and said dynamo electric machine into synchronism, a stroboscope comprising members of said variable and automatically operable impedance element for determining when said motor and said dynamo electric machine are running in synchronism and means for substituting said automatically operating impedance element for said manually operable impedance element when said motor and said dynamo electric machine have reached synchronism, either one or the other of said impedance elements being in the field circuit of said dynamo electric machine under control of said substituting means.

In witness whereof, I hereunto subscribe my name this 13th day of May A. D., 1921.

FRANK W. MERRILL.